(12) United States Patent
Yao et al.

(10) Patent No.: US 10,126,604 B2
(45) Date of Patent: Nov. 13, 2018

(54) LIQUID CRYSTAL DISPLAY PANEL, SEALING PERFORMANCE TESTING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhixiao Yao, Beijing (CN); Bin Feng, Beijing (CN); Yuxi Wang, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 99 days.

(21) Appl. No.: 15/329,122

(22) PCT Filed: Jul. 12, 2016

(86) PCT No.: PCT/CN2016/089798
§ 371 (c)(1),
(2) Date: Jan. 25, 2017

(87) PCT Pub. No.: WO2017/124710
PCT Pub. Date: Jul. 27, 2017

(65) Prior Publication Data
US 2018/0210245 A1    Jul. 26, 2018

(30) Foreign Application Priority Data
Jan. 18, 2016   (CN) .......................... 2016 1 0031600

(51) Int. Cl.
*G02F 1/1343* (2006.01)
*G02F 1/1339* (2006.01)
(Continued)

(52) U.S. Cl.
CPC .............. *G02F 1/1339* (2013.01); *C09J 9/02* (2013.01); *C09J 11/04* (2013.01); *G02F 1/1345* (2013.01);
(Continued)

(58) Field of Classification Search
None
See application file for complete search history.

(56) References Cited

U.S. PATENT DOCUMENTS

2008/0266495 A1* 10/2008 Lin ................... G02F 1/136259
349/106

FOREIGN PATENT DOCUMENTS

CN         104597673 A        5/2015
CN         104793375 A        7/2015
(Continued)

OTHER PUBLICATIONS

International Search Report and Written Opinion dated Sep. 28, 2016; PCT/CN2016/089798.

*Primary Examiner* — Richard Kim
(74) *Attorney, Agent, or Firm* — Ladas & Parry LLP

(57) ABSTRACT

A liquid crystal display panel, a sealing performance testing method thereof and a display device are provided. In the liquid crystal display panel, a side of the array substrate facing the opposed substrate is provided with a plurality of independent first conductive portions, a side of the opposed substrate facing the array substrate is provided with a plurality of independent second conductive portions, sealant is an anisotropic conductive adhesive, all of the first conductive portions and all of the second conductive portions are electrically connected through the sealant to form an unclosed conductor surrounding a display region; by testing a resistance value between any two first conductive portions on the array substrate, it can be determined that there is a
(Continued)

micro gap or breaking sealant problem upon the resistance value being abnormal.

18 Claims, 5 Drawing Sheets

(51) Int. Cl.
    *G02F 1/1345*     (2006.01)
    *C09J 9/02*     (2006.01)
    *C09J 11/04*     (2006.01)
    *C08K 7/18*     (2006.01)
    *C08K 3/08*     (2006.01)

(52) U.S. Cl.
    CPC .......... *G02F 1/134309* (2013.01); *C08K 7/18* (2013.01); *C08K 2003/0806* (2013.01); *C08K 2003/0831* (2013.01); *C08K 2201/001* (2013.01); *G02F 2201/121* (2013.01); *G02F 2201/123* (2013.01); *G02F 2202/28* (2013.01)

(56) References Cited

FOREIGN PATENT DOCUMENTS

| | | |
|---|---|---|
| CN | 105467632 A | 4/2016 |
| KR | 20110067261 A | 6/2011 |
| TW | 200841077 A | 10/2008 |

\* cited by examiner

LIQUID CRYSTAL DISPLAY PANEL, SEALING PERFORMANCE TESTING METHOD THEREOF AND DISPLAY DEVICE

TECHNICAL FIELD

Embodiments of the present invention relate to a liquid crystal display panel, a sealing performance testing method and a display device.

BACKGROUND

In the existing display field, liquid crystal display (LCD) has advantages such as low power consumption, high display quality, no electromagnetic radiation and wide applied range.

A liquid crystal display panel mainly includes an opposed substrate, an array substrate and liquid crystal molecules located between the two substrates. In the manufacturing procedure of an existing liquid crystal display panel, first, respectively forming a plurality of opposed substrate regions and a plurality of array substrate regions on two mother boards; then, coating sealant between the two mother boards, and performing a cell-assembling process; after that, performing a cutting process on the two mother boards along each of the opposed substrate regions and each of the array substrate regions, so as to form a plurality of liquid crystal display regions; at last, bonding a printed circuit board on the array substrate of each of the liquid crystal display panels.

During the manufacturing procedure of an existing liquid crystal display panel, after cutting two mother boards to form a plurality of liquid crystal display panels, with regard to each of the liquid crystal display panel, the sealant located between the array substrate and the opposed substrate is transparent, it is hard for an optical apparatus to detect whether there is a micro gap between the sealant and the array substrate or between the sealant and the opposed substrate, or, whether there is a breaking sealant problem in the sealant; therefore, during the manufacturing procedure of an existing liquid crystal display panel, the liquid crystal display panel having the abovementioned problems will still be subjected to the subsequent bonding process, and the liquid crystal display panel having the abovementioned problems has problems such as the serving life is shortened due to the defective sealing performance during the practical serving process, so as to reduce the yield of liquid crystal display panel.

Therefore, it is a pressing technical problem that how to improve the yield of liquid crystal display panel.

SUMMARY

Embodiments of the present invention provide a liquid crystal panel, sealing performance testing method thereof and display device, so as to improve the yield of liquid crystal display panel.

At least one embodiment of the present invention provides a liquid crystal display panel, which includes: an array substrate; an opposed substrate, the opposed substrate and the array substrate are disposed opposite to each other; closed sealant disposed between the array substrate and the opposed substrate, the sealant surrounds a display region; a plurality of independent first conductive portions, the first conductive portions are disposed at a side of the array substrate facing the opposed substrate; and a plurality of independent second conductive portions, the second conductive portions are disposed at a side of the opposed substrate facing the array substrate, the sealant is anisotropic conductive adhesive, all of the first conductive portions and all of the second conductive portions are electrically connected through the sealant to form an unclosed conductor surrounding the display region.

For example, in the liquid crystal display panel provided by an embodiment of the present invention, the sealant includes a plurality of conductive spheres, all of the first conductive portions and all of the second conductive portions are electrically connected through the conductive spheres to form the unclosed conductor surrounding the display region.

For example, in the liquid crystal display panel provided by an embodiment of the present invention, each of the first conductive portions and each of the second conductive portions are respectively contacted with the sealant, the unclosed conductor includes a continuous portion and an unclosed portion, in the continuous portion, any two adjacent ones of the first conductive portions are electrically connected with each other through the conductive spheres and the second conductive portions electrically connected with the conductive sphere.

For example, in the liquid crystal display panel provided by an embodiment of the present invention, the conductive spheres are insulated with each other; orthographic projections of the first conductive portions on the array substrate and orthographic projections of the second conductive portions on the array substrate are alternately arranged along four side edges of the array substrate; in the continuous portion, any two adjacent orthographic projections are jointed with each other or have an overlapping region, the conductive spheres are located at a joint site or in the overlapping region, such that the first conductive portion and the second conductive portion whose orthographic projections are jointed or have an overlapping region are electrically connected; in the unclosed portion, orthographic projections on the array substrate of the first conductive portion and/or the second conductive portion are not jointed and do not have an overlapping region.

For example, in the liquid crystal display panel provided by an embodiment of the present invention, each of the first conductive portions is electrically connected with two conductive spheres which are adjacent along extending directions of four side edges of the array substrate.

For example, in the liquid crystal display panel provided by an embodiment of the present invention, each of the second conductive portions is electrically connected with two conductive spheres which are adjacent along extending directions of four side edges of the array substrate.

For example, in the liquid crystal display panel provided by an embodiment of the present invention, the conductive spheres comprise at least one conductive sphere groups, each conductive sphere group comprises at least two conductive spheres which are electrically connected, the conductive sphere groups are insulated with each other; in the continuous portion, orthographic projections of the first conductive portions on the array substrate and orthographic projections of the second conductive portions on the array substrate are alternately arranged along extending directions of four side edges of the array substrate, all of the orthographic projections are not overlapped with each other; the first conductive portion and the second conductive portion whose orthographic projections are adjacent are respectively electrically connected with the two conductive spheres located at two ends of the conductive sphere group in one conductive sphere group; the first conductive portion and/or the second conductive portion which are located at two ends of the unclosed portion are respectively electrically connected with different conductive sphere groups.

For example, in the liquid crystal display panel provided by an embodiment of the present invention, the conductive spheres further comprise a plurality of independent conductive spheres, and the independent conductive spheres are insulated with each other; in the continuous portion, orthographic projections on the array substrate of the first conductive portions and the second conductive portions which are electrically connected through the independent conductive spheres are alternately arranged along the extending directions of side edges of the array substrate; two adjacent orthographic projections are jointed or have an overlapping region, the independent conductive spheres, are located at a joint site or in the overlapping region, such that the first conductive portion and the second conductive portion whose orthographic projections are jointed or have an overlapping region are electrically connected; in the unclosed portion, orthographic projections on the array substrate of the first conductive portion and/or the second conductive portion which are located at two ends of the unclosed portion of the conductor are not jointed or do not have an overlapping region; in the continuous portion, orthographic projections on the array substrate of the first conductive portions and the second conductive portions which are electrically connected through the conductive sphere group are alternately arranged along extending directions of side edges of the array substrate, all of the orthographic projections are not overlapped with each other; the first conductive portion and the second conductive portion whose orthographic projections are adjacent are respectively electrically connected with the two conductive spheres located at two ends of the conductive sphere group in one conductive sphere group; in the unclosed portion, the first conductive portion and/or the second conductive portion which are located at two ends of the unclosed portion of the conductor are respectively electrically connected with different conductive sphere groups.

For example, the liquid crystal display panel provided by an embodiment of the present invention further includes: a pixel electrode and a common electrode line which are located at the side of the array substrate facing the opposed substrate; a common electrode located at the side of the opposed substrate facing the array substrate; a third conductive portion which is located between the array substrate and the sealant, insulated with the pixel electrode and electrically connected with the common electrode line; and a fourth conductive portion which is located between the opposed substrate and the sealant and electrically connected with the common electrode, the third conductive portion and the fourth conductive portion are electrically connected through the sealant to electrically connect the common electrode and the common electrode line; the first conductive portions are respectively insulated with the pixel electrode, the common electrode line and the third conductive portion, the second conductive portions are respectively insulated with the common electrode and the fourth conductive portion.

For example, in the liquid crystal display panel provided by an embodiment of the present invention, the first conductive portions and the pixel electrode are formed from a same layer of material.

For example, in the liquid crystal display panel provided by an embodiment of the present invention, the second conductive portions and the common electrode are formed from a same layer of material.

For example, in the liquid crystal display panel provided by an embodiment of the present invention, the third conductive portion and the pixel electrode are formed from a same layer of material.

For example, in the liquid crystal display panel provided by an embodiment of the present invention, the fourth conductive portion and the common electrode are formed from a same layer of material.

For example, the liquid crystal display panel provided by an embodiment of the present invention further includes: a common electrode and common electrode line, and a pixel electrode respective insulated with the common electrode and the common electrode line, which are located at the side of the array substrate facing the opposed substrate; the first conductive portions are respectively insulated with the pixel electrode, the common electrode and the common electrode line.

For example, in the liquid crystal display panel provided by an embodiment of the present invention, the first conductive portions and the pixel electrode or the common electrode are formed from a same layer of material.

For example, in the liquid crystal display panel provided by an embodiment of the present invention, the array substrate comprises a bonding region, the bonding region is disposed at least one side edge of the array substrate, the first conductive portions disposed at the side edge where the bonding region is provided extends into the bonding region; the first conductive portions extending into the bonding region are insulated with a peripheral wiring and a wiring terminal which are located in the bonding region For example, in the liquid crystal display panel provided by an embodiment of the present invention, any two of the first conductive portions extending into the bonding region are used to perform a resistance test.

For example, in the liquid crystal display panel provided by an embodiment of the present invention, the first conductive portions and the peripheral wire and the wiring terminal which are located in the bonding region are disposed in different layers; the liquid crystal display panel further includes: an insulating layer located between a layer where the first conductive portions are located and a layer where the peripheral wire and the wiring terminal are located.

At least one embodiment of the present invention provides a display device, which includes any one of the abovementioned liquid crystal display panel.

At least one embodiment of the present invention provides a sealing performance testing method of a liquid crystal display panel, used to test any one of the abovementioned liquid crystal display panel, which includes: testing a resistance value between any two of the first conductive portions in the bonding region; upon the detected resistance value being abnormal, determining that there is a defect in the sealant in the corresponding regions of the two first conductive portions or between the corresponding regions of the two first conductive portions.

Embodiments of the present invention provide the abovementioned liquid crystal display panel, sealing performance testing method and display device. In the liquid crystal display panel, a plurality of independent first conductive portions are disposed at a side of the array substrate facing the opposed substrate, a plurality of independent second conductive portions are disposed at a side of the opposed substrate facing the array substrate, all of the first conductive portions and all of the second conductive portions are electrically connected through the sealant, to form an unclosed conductor surrounding the display region, in this way, the unclosed conductor constitutes an electrical testing structure, it can be determined that there is a micro gap or breaking sealant problem upon the resistance value is abnormal by testing the resistance between any two of the first conductive portions on the array substrate, and the yield of the liquid crystal display panels can be improved by intercepting the liquid crystal display panel which having micro gap or breaking sealant problem to be absent from entering the subsequent processes.

DETAILED DESCRIPTION

Hereafter, the embodiments of the liquid crystal display panel, sealing performance testing method and display device provided by the embodiments of the present invention will be described in an understandable and detailed way with reference to the accompanying drawings.

Shape and thickness of the film layers in the accompanying drawings do not reflect a real proportion of an array substrate or an opposed substrate, and the purpose is only to schematically illustrate the content of the present invention.

Figure 1:
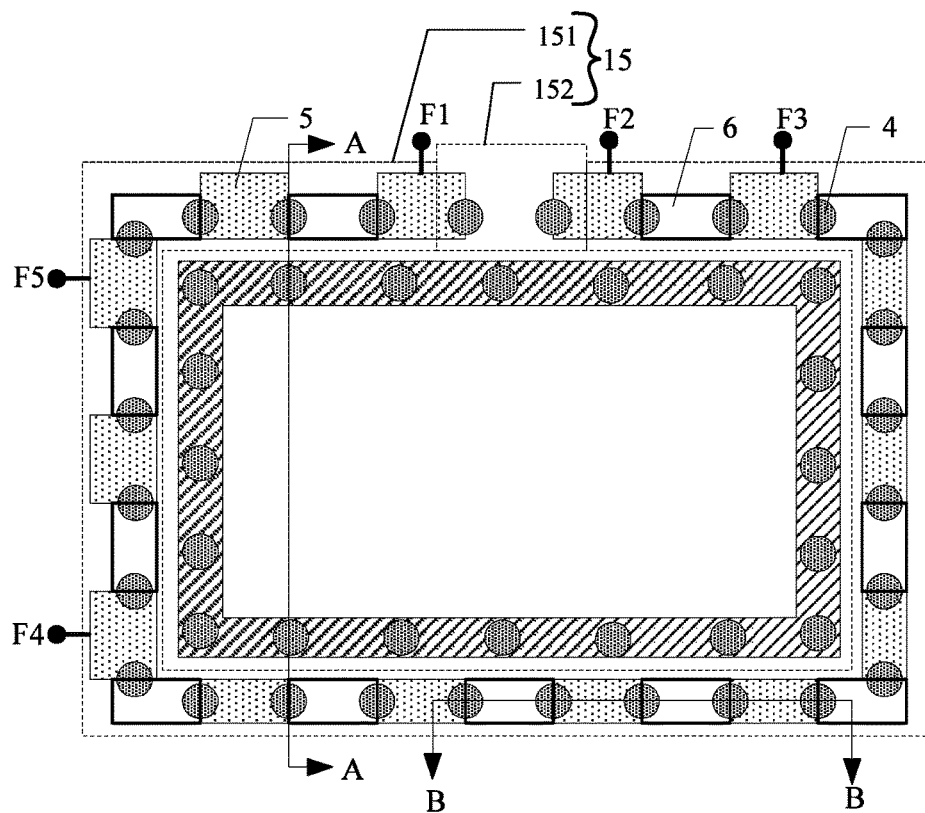
FIG. 1 is a structural schematic diagram of a liquid crystal display panel provided by an embodiment of the present invention.
Figure 3:
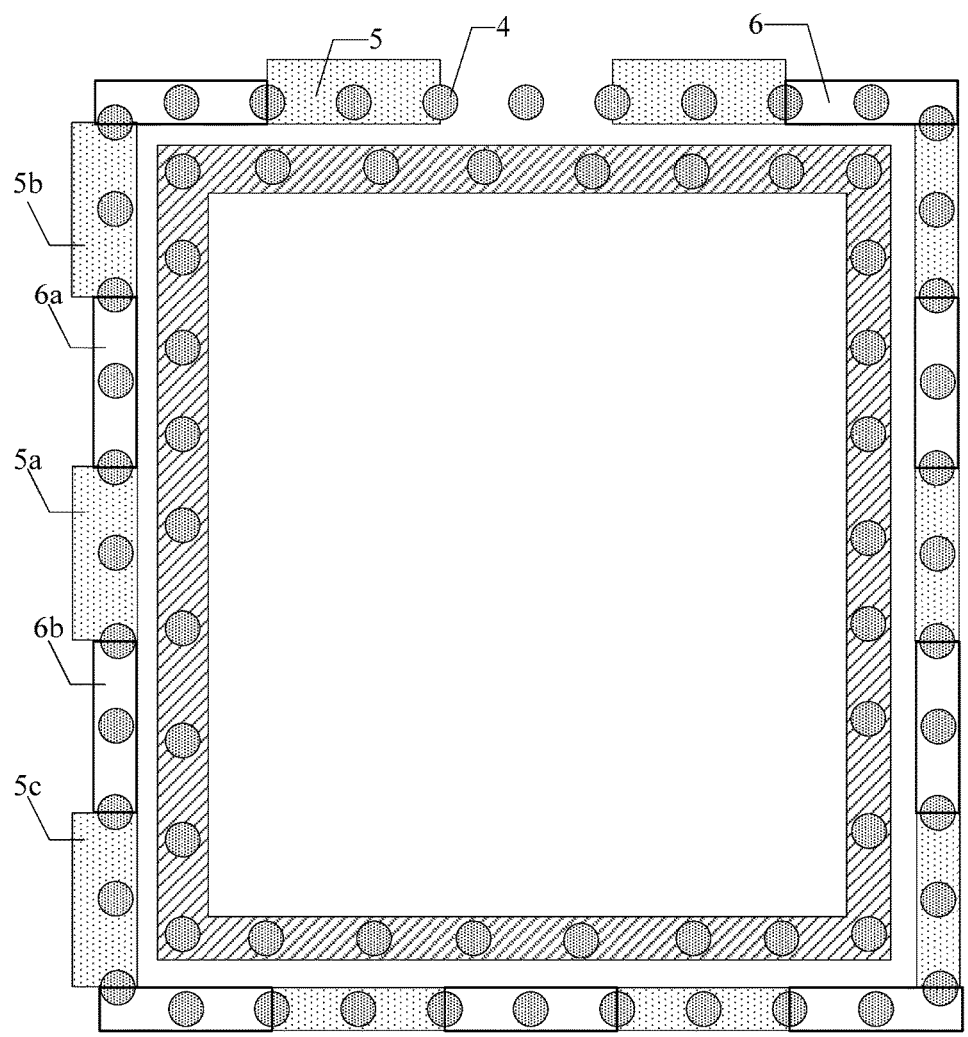
FIG. 3 is a structural schematic diagram of another liquid crystal display panel provided by an embodiment of the present invention.
Figure 4:
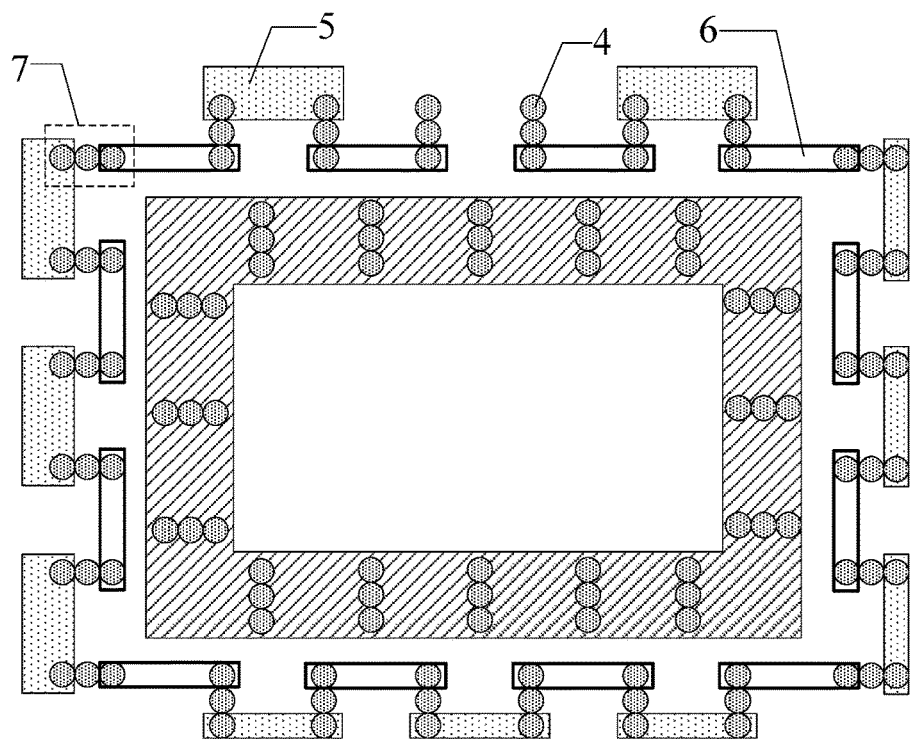
FIG. 4 is a structural schematic diagram of another liquid crystal display panel provided by an embodiment of the present invention.
Figure 5A:
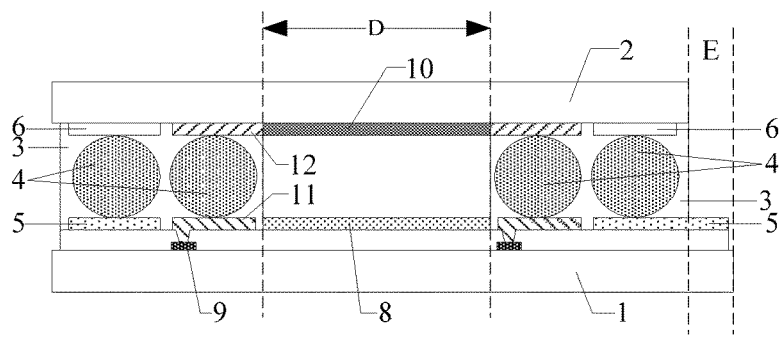
FIG. 5a is a sectional schematic view along AA direction in FIG. 1 of a liquid crystal display panel provided by an embodiment of the present invention.
Figure 5B:
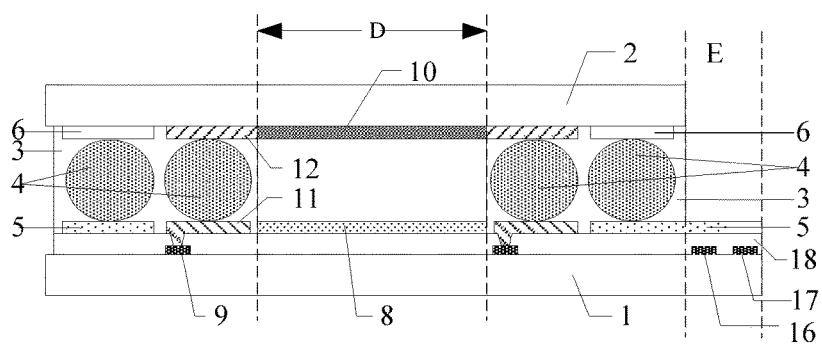
FIG. 5b is a sectional schematic view along AA direction in FIG. 1 of another liquid crystal display panel provided by an embodiment of the present invention.
Figure 6:
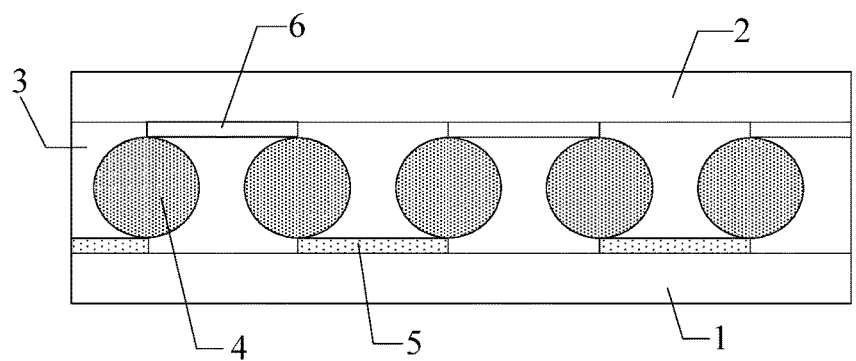
FIG. 6 is a sectional schematic view along BB direction in FIG. 1 of a liquid crystal display panel provided by an embodiment of the present invention.
Figure 7:
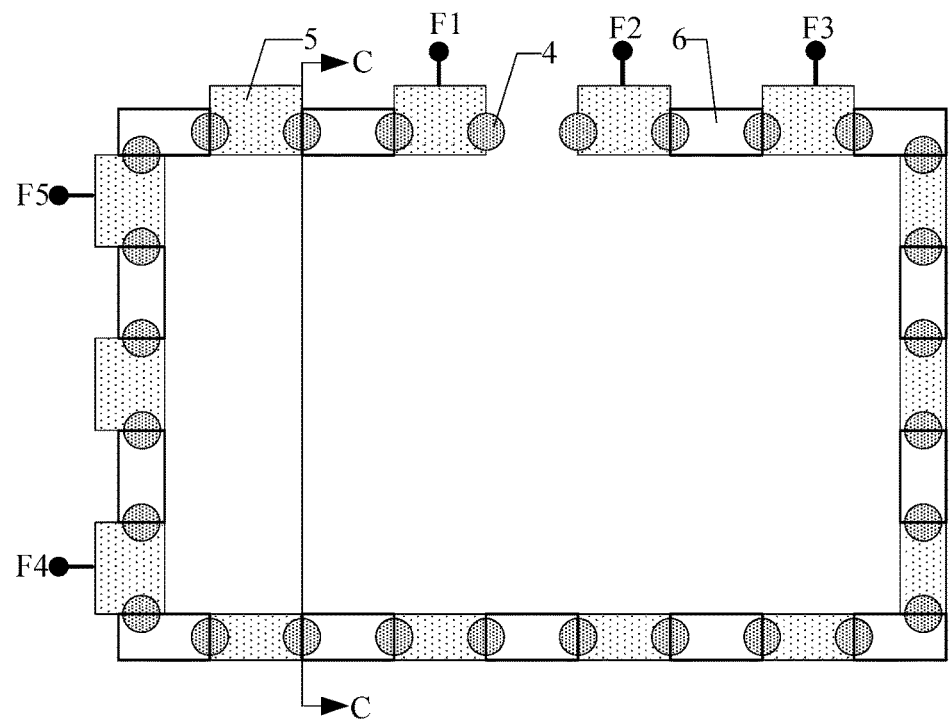
FIG. 7 is a structural schematic diagram of another liquid crystal display panel provided by an embodiment of the present invention.
Figure 8:
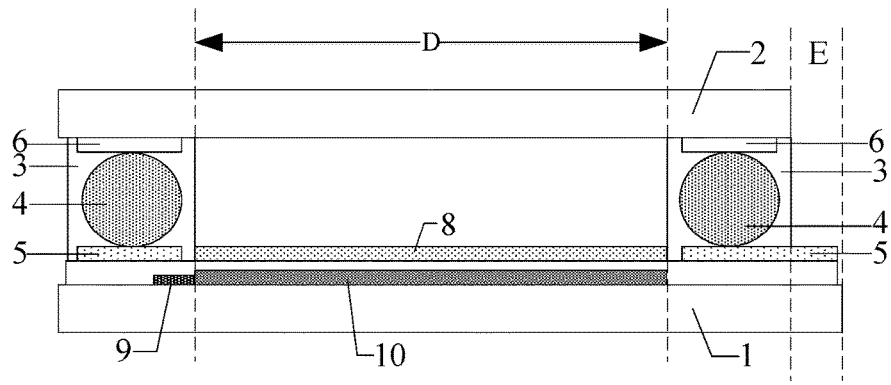
FIG. 8 is a sectional schematic view along CC direction in FIG. 7 of a liquid crystal display panel provided by an embodiment of the present invention.

Embodiments of the present invention provide a liquid crystal display panel, as illustrated by FIGS. 1-8, wherein FIGS. 5a, 5b and 6 are sectional views along AA and BB directions in FIG. 1, FIG. 8 is a sectional view along CC direction in FIG. 7. The liquid crystal display panel includes: an array substrate 1 and an opposed substrate 2 which are disposed opposite to each other; sealant 3 whose boundaries are closed and which is located between the array substrate 1 and the opposed substrate 2 and surrounding a display region (for example, as illustrated by region D in FIGS. 5 and 8), that is to say that sealant 3 is closed, and forms a closed frame body as a whole, so as to seal a space (for example, a liquid crystal cell) formed between the array substrate 1 and the opposed substrate 2; a plurality of independent first conductive portions 5 located at a side of the array substrate 1 facing the opposed substrate 2; and a plurality of independent second conductive portions 6 located at a side of the opposed substrate 2 facing the array substrate 1. Sealant 3 is anisotropic conductive adhesive, all of the first conductive portions 5 and all of the second conductive portions 6 are electrically connected through the sealant 3, to form an unclosed conductor 15 surrounding the display region. It is to be noted that the abovementioned display region refers to a region of the liquid crystal display panel which is configured to realize displaying, a region where the user can watch images; in some embodiments, the display region not only includes pixels used for displaying but also includes a black matrix disposed among the pixels; the abovementioned unclosed conductor refers to a frame shaped conductor comprising a non-conductive breach, i.e., an unclosed portion, such that it is easy to determine the direction of electric current upon any two positions of the unclosed conductor are applied with a voltage difference.

Figure 9:
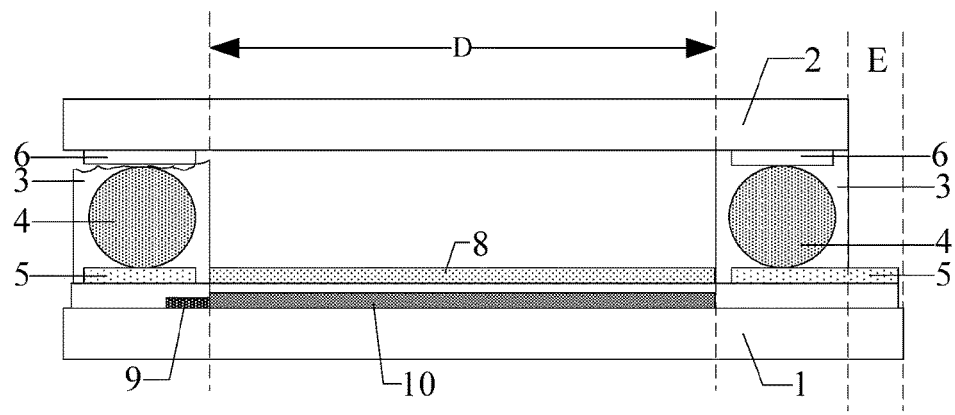
FIG. 9 is a structural schematic diagram of a liquid crystal display panel in which there is a micro gap between sealant and opposed substrate provided by an embodiment of the present invention.

In the abovementioned liquid crystal display panel provided by the embodiments of the present invention, the sealant is anisotropic conductive adhesive, the sealant is conductive along a direction perpendicular to the array substrate and is non-conductive along the extending directions of edges of the array substrate; the abovementioned technical feature that all of the first conductive portions 5 and all of the second conductive portions 6 are electrically connected through the sealant 3 refers to that a first conductive portion 5 is electrically connected with a corresponding second conductive portion 6 through the sealant 3, then, the second conductive portion 6 is electrically connected with next first conductive portion 5 through the sealant, such that all of the first conductive portions 5 and all of the second conductive portions 6 are electrically connected through the sealant 3, so as to form an unclosed conductor 15 surrounding the display region. Therefore, a plurality of independent first conductive portions cannot be electrically connected only through the sealant, but through the second conductive portions together with the sealant; if there is a defect such as a breach or breaking sealant in the sealant, it must affect the electrical connection between the first conductive portions and the second conductive portions. In this way, the first conductive portions and the second conductive portions constitute an electric testing structure (i.e., the abovementioned unclosed conductor) by electrically connecting with the sealant, by means of testing the resistance between any two first conductive portions on the array substrate, it can be determined that there is a breakpoint between the two first conductive portions upon the resistance value is abnormal (for example, the resistance value is very large), the breakpoint is caused by a micro gap (as illustrated by FIG. 9) between the sealant located between the two first conductive portions and the array substrate or the opposed substrate or a breaking sealant problem in the sealant between the two first conductive portions. Therefore, it can be determined that whether there is a micro gap or breaking sealant problem in the sealant by testing the resistance between any two first conductive portions, and the yield of liquid crystal display panels can be improved by intercepting the liquid crystal display panel which having micro gap or breaking sealant problem to be absent from entering the subsequent processes.

For example, in the liquid crystal display panel provided by an embodiment of the present invention, as illustrated by FIGS. 1 to 8, sealant 3 includes a plurality of conductive spheres 4, all of the first conductive portions 5 and all of the second conductive portions 6 are electrically connected through the conductive spheres 4, to form a conductor whose boundaries are unclosed and which surrounds the display region. Certainly, the embodiments of the present invention includes but are not limited thereto, the sealant can further includes an anisotropic conductive adhesive with other forms.

For example, in the liquid crystal display panel provided by an embodiment of the present invention, in order to guarantee that all of the first conductive portions and all of the second conductive portions are electrically connected through the conductive spheres, as illustrated by FIG. 5a, every first conductive portion 5 and every second conductive portion 6 are respectively contacted with the sealant 3, i.e., every first conductive portion 5 is located between the array substrate 1 and the sealant 3, every second conductive portion 6 is located between the opposed substrate and the sealant 3. As illustrated by FIG. 1, the unclosed conductor 15 includes a continuous portion 151 and an unclosed portion 152, in the continuous portion 151, any two first conductive portion 5 are electrically connected through conductive sphere 4 and a second conductive portion 6 which is electrically connected with the conductive sphere 4. That is to say that, two first conductive portions 5 on the array substrate 1 are electrically connected through the conductive sphere 4 disposed in the sealant 3 on the array substrate 1 and a second conductive portion 6 which is electrically connected with the conductive sphere 4 and disposed at a corresponding position of the opposed substrate 2.

It is to be noted that, in the liquid crystal display panel provided by the embodiments of the present invention, the conductive sphere can be a metal sphere, such as a gold sphere or a silver sphere, which is not limited thereto.

It is to be noted that, in order to illustrate in an understandable way, as illustrated by FIGS. 5a, 5b, 6 and 8, the liquid crystal display panel provided by the embodiments of the present invention is described by taking a case where the size of the conductive sphere 4 in a direction perpendicular to the array substrate 1 is equal to the cell thickness of the liquid crystal display panel as an example. Certainly, the embodiments of the present invention include but are not limited thereto. The conductive spheres can be a plurality of spheres whose sizes are smaller than the cell thickness of the liquid crystal display panel and which electrically connect the first conductive portion and the second conductive portion through a stacking way.

For example, in the liquid crystal display panel provided by the embodiments of the present invention, the arrangement state of the conductive spheres in the sealant can be controlled by adjusting the doping ratio of the conductive spheres in the sealant. For example, upon the doping ratio of the conductive spheres in the sealant is relatively large, the arrangement state of the conductive spheres in the sealant is a state where a part of the conductive spheres are electrically connected; upon the doping ratio of the conductive spheres in sealant is relatively small, the arrangement state of the conductive spheres in the sealant can be a state where all of conductive spheres are insulated with each other.

Figure 2:
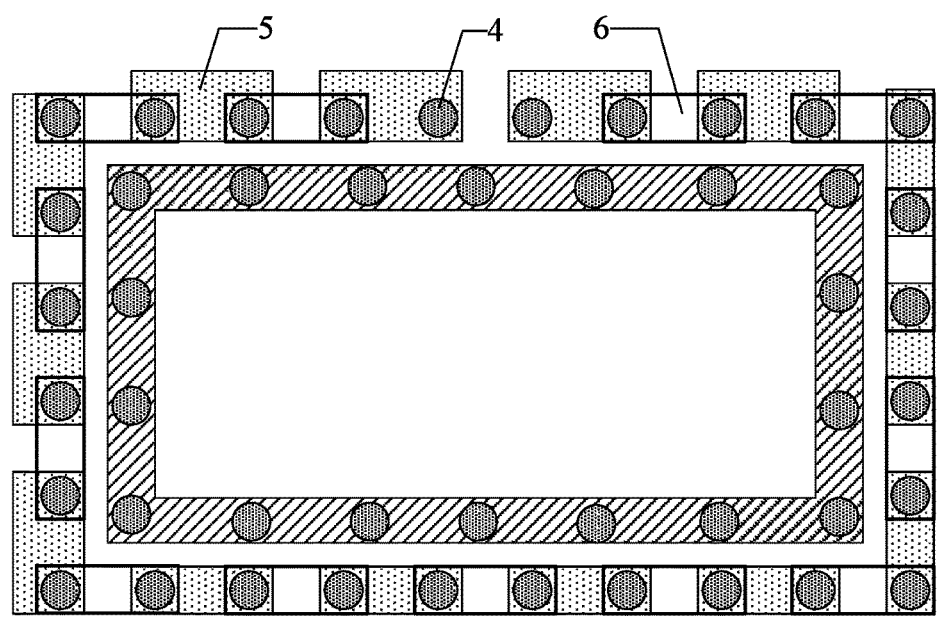
FIG. 2 is a structural schematic diagram of another liquid crystal display panel provided by an embodiment of the present invention.

For example, in the liquid crystal display panel provided by the embodiments of the present invention, upon the arrangement state of the conductive spheres in the sealant is a state where all of the conductive spheres are insulated from each other, as illustrated by FIGS. 1 and 2, in order to realize that all of the first conductive portions 5 and the all of the second conductive portions 6 are electrically connected through the conductive spheres 4, to form a conductor 15 whose boundaries are unclosed and which is surrounding the display region, the structures of the first conductive portions 5 and the second conductive portions 6 can be illustrated by FIGS. 1 and 2, in the continuous portion 151, the orthographic projections of the first conductive portions 5 on the array substrate 1 and the orthographic projections of the second conductive portions 6 on the array substrate 1 are alternately arranged along the extending directions of four side edges of the array substrate 1; as illustrated by FIG. 1, two adjacent orthographic projections are jointed, and the conductive sphere 4 is located at the joint site, such that the first conductive portion 5 and the second conductive portion 6 whose orthographic projections are jointed are electrically connected, or, as illustrated by FIG. 2, two adjacent orthographic projections have an overlapping region, and the conductive sphere 4 is located in the overlapping region, such that the first conductive portion 5 and the second conductive portion 6 whose orthographic projections have an overlapping region are electrically connected; besides, two ends of the unclosed position (i.e., unclosed portion) of the formed conductor may be a first conductive portion and a second conductive portion, or, as illustrated by FIGS. 1 and 2, the two ends of the unclosed position (i.e., unclosed portion) of the formed conductor may be two first conductive portions, or, the two ends of the unclosed position (i.e., unclosed portion) of the formed conductor may be two second conductive portions, which are not limited thereto; the orthographic projections on the array substrate of the first conductive portion and/or the second conductive portion which are located at two ends of the unclosed portions of the formed conductor are not jointed and do not have an overlapping region, for example, as illustrated by FIGS. 1 and 2, the orthographic projections on the array substrate 1 of the two first conductive portions 5 which are located at two ends of the unclosed portion of the conductor are not jointed and do not have an overlapping region.

For example, in the liquid crystal display panel provided by the embodiments of the present invention, according to the differences of the doping ratio of the conductive spheres in the sealant and the size of first conductive portion, as illustrated by FIGS. 1 and 2, each of the first conductive portions 5 may be electrically connected with two conductive spheres 4 which are adjacent along the extending directions of four side edges of the array substrate 1, or, as illustrated by FIG. 3, each of the first conductive portions 5 is electrically connected with at least three conductive spheres 4 which are adjacent along the extending directions of the four side edges of the array substrate 1, which are not limited thereto; according to the differences of the doping ratio of the conductive spheres in the sealant and the size of the conductive portions, as illustrated by FIGS. 1 and 2, each of the second conductive portions 6 can be electrically connected with two conductive spheres 4 which are adjacent along the extending directions of the four side edges of the array substrate 1, or, as illustrated by FIG. 3, each of the second conductive portion 6 can be electrically connected with at least three conductive spheres 4 which are adjacent along the extending directions of the four side edges of the array substrate 1, which are not limited thereto.

For example, in the liquid crystal display panel provided by an embodiment of the present invention, as illustrated by FIG. 3, upon each of the first conductive portions 5 is electrically connected with at least three conductive spheres 4 which are adjacent along the extending directions of the four side edges of the array substrate 1 and each of the second conductive portions 6 is electrically connected with at least three conductive spheres 4 which are adjacent along the extending directions of the four side edges of the array substrate 1, for example, upon the conductive sphere 4 located in the middle position among the three conductive spheres 4 which are electrically connected with the first conductive portion 5a has a micro gap with the array substrate 1 or the opposed substrate 2, because the conductive sphere 4 located in the middle position is not a conductive sphere 4 which is electrically connected with the second conductive portions 6a and 6b, the micro gap will not cause the break of the first conductive portion 5a and the second conductive portions 6a and 6b; upon performing a resistance test between the two first conductive portions 5b and 5c which are located at two sides of the first conductive portion 5a, the tested resistance is a limited value, therefore, the structure illustrated by FIG. 3 cannot detect the micro gap, so as to affect of the yield of the liquid crystal display panel to some degrees.

Based on this, in order to improve the detection rate of the micro gap and the breaking sealant problem, so as to further improve the yield of the liquid crystal display panels, in the liquid crystal display panel provided by the embodiments of the present invention, as illustrated by FIGS. 1 and 2, each of the first conductive portions 5 is electrically connected with two conductive spheres 4 which are adjacent along the extending directions of four side edges of the array substrate 1.

For example, in order to further improve the detection rate of the micro gap and the breaking sealant problem, so as to further improve the yield of the liquid crystal display panels, in the liquid crystal display panel provided by the embodiments of the present invention, as illustrated by FIGS. 1 and 2, each of the second conductive portions 6 is electrically connected with two conductive spheres 4 which are adjacent along the extending directions of the four side edges of the array substrate 1.

For example, in the liquid crystal display panel provided by the embodiments of the present invention, the conductive spheres include at least one conductive sphere group, each conductive sphere group includes at least two conductive spheres which are electrically connected, and the conductive sphere groups are insulated with each other; in the continuous portion, the orthographic projections of the first conductive portions on the array substrate and the orthographic projections of the second conductive portions on the array substrate are alternately arranged along the extending directions of the four side edges of the array substrate, all of the orthographic projections are not overlapped with each other; the first conductive portion and the second conductive portion whose orthographic projections are adjacent are respectively electrically connected with two conductive spheres which are located at the two ends of the conductive sphere group in one conductive sphere group; the first conductive portion and/or the second conductive portion which are located at two ends of the unclosed portion are electrically connected with different conductive sphere groups.

For example, in the liquid crystal display panel provided by the embodiments of the present invention, upon the arrangement state of the conductive spheres in the sealant is a state where a part of the conductive spheres are electrically connected, as illustrated by FIG. 4, a case where every three conductive spheres 4 are electrically connected to form a conductive sphere group 7 and the conductive sphere groups 7 are insulated with each other is described as an example, in order to realize that all of the first conductive portions 5 and all of the second conductive portions 6 are electrically connected through the conductive spheres 4 to form a conductor whose boundaries are unclosed and which is surrounding the display region, the structures of the first conductive portion 5 and the second conductive portion 6 can be illustrated by FIG. 4, orthographic projections on the array substrate 1 of the first conductive portions 5 and orthographic projections on the array substrate 1 of the second conductive portions 6 are alternately arranged in the extending directions of four side edges of the array substrate 1, all of the orthographic projections are not overlapped with each other; the first conductive portion 5 and the second conductive portion 6 whose orthographic projections are adjacent are respectively electrically connected with the two conductive spheres 4 located at two ends of the conductive sphere group in a conductive sphere group 7; besides, the two ends of the unclosed portion of the formed conductor can be a first conductive portion and a second conductive portion, or, the two ends of the unclosed portion of the formed conductor may be two first conductive portions, or, as illustrated by FIG. 4, the two ends of the unclosed portion of the formed conductor can be two second conductive portions 6, which are limited thereto. The first conductive portion and/or the second conductive portion which are located at two ends of the unclosed portion of the formed conductor are respectively electrically connected with different conductive sphere groups, for example, as illustrated by FIG. 4, the two second conductive portions 6 which are located at the two ends of the unclosed portion of the formed conductor are respectively electrically connected with the different conductive sphere groups 7.

For example, in the liquid crystal display panel provided by the embodiments of the present invention, the arrangement state of the conductive spheres in the sealant can be a state where the situation illustrated by FIG. 1 (or FIG. 2) and the situation illustrated by FIG. 4 coexist, that is to say, the conductive spheres not only include a plurality of conductive sphere groups but also include a plurality of independent conductive spheres, the independent conductive spheres are insulated with each other, i.e., a part of the conductive spheres is insulated with each other (independent conductive spheres) (i.e., the arrangement state as illustrated by FIG. 1 or FIG. 2), the rest conductive spheres are in a form that at least two conductive spheres are electrically connected to form a conductive sphere group (an arrangement state as illustrated by FIG. 4), the conductive sphere groups are insulated with each other and insulated with the conductive spheres which are insulated with each other. The orthographic projections of the first conductive portion and the second conductive portion which are electrically connected through the conductive spheres on the array substrate are alternately arranged in the extending directions of the side edges of the array substrate; two adjacent orthographic projections are jointed or have an overlapping region, the conductive spheres are located at the joint site or in the overlapping region, such that the first conductive portion and the second conductive portion whose orthographic projections are jointed or have an overlapping region are electrically connected; the orthographic projections of the first conductive portion and/or the second conductive portion which are located at two ends of the unclosed portion of the formed conductor on the array substrate are not jointed and do not have an overlapping region; the orthographic projections of the first conductive portion and the second conductive portion which are electrically connected with the conductive sphere groups on the array substrate are alternately arranged along the extending directions of the side edges of the array substrate, all of the orthographic projections are not overlapped with each other; the first conductive portion and the second conductive portion whose orthographic projections are adjacent are respectively electrically connected with two conductive spheres located at two ends of the conductive sphere group in the conductive sphere group; the first conductive portion and/or the second conductive portion which are located at two ends of the unclosed portion of the formed conductor are electrically connected with different conductive sphere groups. The embodiments of the liquid crystal display panel having this structure is similar to the embodiments of FIGS. 1, 2 and 4, and the repeated portions are omitted herein.

It is to be noted that, in the liquid crystal display panel provided by the embodiments of the present invention, the structures of the first conductive portion and the second conductive portions are not limited to the structures as illustrated by FIGS. 1-4, the structures of the first conductive portion and the second conductive portion can be other forms which can realize the structure that all of the first conductive portions and the all of the second conductive portions are electrically connected through the conductive spheres to form a conductor whose boundaries are unclosed and which surrounds the display region, which is not limited thereto.

It is to be noted that, the liquid crystal display panel provided by the embodiments of the present invention, as illustrated by FIG. 5a, can be applied to a twisted nomadic (TN) mode liquid crystal display panel, i.e., the common electrode is disposed at the side of the opposed substrate; or the liquid crystal display panel provided by the embodiments of the present invention, as illustrated by FIG. 8, can be applied to an advanced super dimension switch (ADS) mode and in-plane switch (IPS) mode liquid crystal display panel, i.e., the common electrode is disposed at the side of the array substrate, which is not limited thereto. Hereafter, two specific embodiments will be described to clearly describe the implementations in which the liquid crystal display panel provided by the embodiments of the present invention are applied to the abovementioned three modes of liquid crystal display panels.

First Embodiment: The Liquid Crystal Display Panel Provided by the Embodiments of the Present Invention is Applied to a TN Mode Liquid Crystal Display Panel The liquid crystal display panel provided by the embodiments of the present invention, as illustrated by FIG. 5a, FIG. 5a is a sectional view along AA direction in FIG. 1, the liquid crystal display panel further includes a pixel electrode 8 and a common electrode line 9 which are insulated with each other and disposed on a side of the array substrate 1 facing the opposed substrate 2; a common electrode 10 located at a side of the opposed substrate 2 facing the array substrate 1; a third conductive portion 11 which is located between the array substrate 1 and the sealant 3, insulated with the pixel electrode 8 and electrically connected with the common electrode line 9; and a fourth conductive portion 12 which is located between the opposed substrate 2 and the sealant 3 and electrically connected with the common electrode 10, the third conductive portion 11 and the fourth conductive portion 12 are electrically connected through the sealant 3 (for example, through the conductive sphere 4 in the sealant 3), so as to electrically connect the common electrode 10 and the common electrode line 9; in order to avoid the problem that it cannot detect the micro gap or breaking sealant problem through an electrical test due to the first conductive portions 5 being electrically connected through the pixel electrode 8, common electrode line 9 or the third conductive portion 11, it is necessary to insulate the first conductive portions 5 with the pixel electrode 8, the common electrode line 9 and the third conductive portion 11, likewise, in order to avoid the problem that it cannot detect the micro gap or breaking sealant problem through an electrical test due to the second conductive portions 6 being electrically connected through the common electrode 10, or the fourth conductive portion 12, it is necessary to insulate the second conductive portions 6 with the common electrode 10 and the fourth conductive portion 12.

For example, in the liquid crystal display panel provided by the embodiments of the present invention, the material of the first conductive portion, the second conductive portion, the third conductive portion and the fourth conductive portion can be any conductive material, for example, a transparent conductive oxide or metal, which is not limited thereto.

For example, in the liquid crystal display panel provided by the embodiments of the present invention, the material of the first conductive portion may be indium tin oxides (ITO), because the material of the first conductive portion and material of the pixel electrode which is located at the side of the array substrate are the same, thus, in order to simplify the manufacturing processes of the liquid crystal display panel, and reduce the manufacturing costs of the liquid crystal display panel, the first conductive portion and the pixel electrode can be configured to be formed by the same layer of material, i.e., the first conductive portion and the pixel electrode are formed form the same layer of material by the same patterning process.

For example, in the liquid crystal display panel provided by the embodiments of the present invention, the material of the second conductive portion may be ITO, because the material of the second conductive portion and the material of the common electrode which is located at the side of the opposed substrate are same, in order to further simplify the manufacturing processes of the liquid crystal display panel and further reduce the manufacturing costs of the liquid crystal display panel, the second conductive portion and the common electrode can be configured to be formed from the same layer of material, i.e., the second conductive portion and the common electrode are formed form the same layer of material by the same patterning process.

For example, in the liquid crystal display panel provided by the embodiments of the present invention, the material of the third conductive portion may be ITO, because the material of the third conductive portion and the material of the pixel electrode located at the side of the array substrate are same, in order to further simplify the manufacturing processes of the liquid crystal display panel and further reduce the manufacturing costs of the liquid crystal display panel, the third conductive portion and the pixel electrode can be configured to be formed from the same layer of material, i.e., the third conductive portion and the pixel electrode are formed form the same layer of material by the same patterning process.

For example, in the liquid crystal display panel provided by the embodiments of the present invention, the material of the fourth conductive portion can be ITO, because the material of the fourth conductive portion and the material of the common electrode located at the side of the opposed substrate are same, in order to further simplify the manufacturing processes of the liquid crystal display panel, and further reduce the manufacturing costs of the liquid crystal display panel, the fourth conductive portion and the common electrode can be configured to be formed from the same layer of material, i.e., the fourth conductive portion and the common electrode are formed from the same layer of material through the same patterning process.

For example, in the liquid crystal display panel provided by the embodiments of the present invention, the array substrate includes a bonding region, and the bonding region is disposed at least one side edge of the array substrate, in order to conveniently bond a printed circuit board on the array substrate, as illustrated by FIG. 5a, it is necessary to dispose the opposed substrate 2 to be able to expose a wiring terminal which is configured to electrically connect the printed circuit board and located at a side of the array substrate 1, and the exposed region is a bonding region E, besides, the bonding region is generally disposed at the upper edge frame and a left frame edge frame of the liquid crystal display panel. In order to conveniently perform a resistance test between any two first conductive portions, as illustrated by FIGS. 1-4, the first conductive portions 5 which are arranged along two side edges of the array substrate 1 where the bonding region is provided (FIGS. 1-4 illustrate an example where the bonding region is located at the upper edge frame and the left edge frame) extend into the bonding region, in order to avoid the problem that it cannot detect the micro gap or breaking sealant problem through an electrical test due to the first conductive portions 5 being electrically connected through a peripheral wire or a wiring terminal, it is necessary to insulate the first conductive portions 5 which extend to the bonding region with the peripheral wire and wiring terminal which are located in the bonding region.

For example, in the liquid crystal display panel provided by the embodiments of the present invention, any two of the first conductive portions extending into the bonding region can be used for resistance test, and it can be determined that whether there is a micro gap or breaking sealant problem in the sealant between the two first conductive portions according to the tested resistance value. As illustrated by FIG. 1, the resistance value between a testing point F1 and a testing point F2 can be tested to judge whether there is a micro gap or breaking sealant problem in the whole sealant; if the resistance value between the testing point F1 and the testing point F2 is a limited value, it can be determined that there is no micro gap or breaking sealant problem in the whole sealant, and the subsequent processes can be conducted; if the resistance value between the testing point F1 and the testing point F2 is abnormal, it can be determined that there is a micro gap or breaking sealant problem in the sealant, and it is necessary to intercept the liquid crystal display panel from entering the subsequent processes. Besides, upon the resistance value between the testing point F1 and the testing point F2 is abnormal, the resistance value between a testing point F3 and a testing point F4 can be tested to judge whether there is a micro gap or breaking sealant problem in the sealant in the non-bonding region (i.e., the lower frame and the right frame) of the liquid crystal display panel; if the resistance value between the testing point F3 and the testing point F4 is a limited value, it can be determined that there is no micro gap or breaking sealant problem in the sealant in the non-bonding region (i.e., the lower frame and the right frame). Upon the resistance value between the testing point F3 and the testing point F4 is a limited value, testing points between the testing point F1 and the testing point F4 can be selected to continue the resistance test, the resistance value between the testing point F1 and the testing point F5 and the resistance value between the testing point F4 and the testing point F5 can be tested, in this way, the position of the micro gap and breaking sealant can be roughly determined by means of continuously narrowing the testing range.

For example, in the liquid crystal display panel provided by the embodiments of the present invention, the first conductive portions extending into the bonding region and the peripheral wirings and wiring terminal which are located in the bonding region are insulated with each other, which can be realized by the following structure. As illustrated by FIG. 5b, the first conductive portion 5 and the peripheral wirings 16 and wiring terminal 17 which are located in the bonding region E are disposed in different layers, and an insulating layer 18 can be disposed between a film layer where the first conductive portion 5 is located and the film layer where the peripheral wirings 16 and wiring terminal 17 are located.

Certainly, in the liquid crystal display provided by the embodiments of the present invention, the insulating layer can be omitted, the mutual insulation between the first conductive portions extending into the bonding region and the peripheral wirings and wiring terminal which are located in the bonding region can be realized by not overlapping the orthographic projections on the array substrate of the first conductive portions and the orthographic projections on the array substrate of the peripheral wirings and wiring terminal which are located in the bonding region, which is not limited thereto.

Second Embodiment: The Liquid Crystal Display Panel Provided by the Embodiments of the Present Invention is Applied to an ADS or IPS Mode Liquid Crystal Display Panel The liquid crystal display panel provided by the embodiments of the present invention, as illustrated by FIGS. 7 and 8, may further include: a common electrode 10 and a common electrode line 9, and a pixel electrode 8 which is insulated with the common electrode 10 and the common electrode line 9 which are located at a side of the array substrate 1 facing the opposed substrate 2; in order to avoid the problem that it can hardly detect the micro gap or sealing breaking problem due to the first conductive portions 5 being electrically connected through the pixel electrode 8, the common electrode 10 or the common electrode line 9, the first conductive portions 5 are required to be insulated with the pixel electrode 8, the common electrode 10 and the common electrode line 9.

For example, in the liquid crystal display panel provided by the embodiments of the present invention, the material of the first conductive portions and the second conductive portions can be any conductive material, for example, transparent conductive oxide or metal, which is not limited thereto.

For example, in the liquid crystal display panel provided by the embodiments of the present invention, the material of the first conductive portion can be ITO, because the material of the first conductive portion and the material of the pixel electrode and the common electrode are the same, thus, in order to simplify the manufacturing processes of the liquid crystal display panel and reduce the manufacturing costs of the liquid crystal display panel, the first conductive portion and the pixel electrode can be configured to be formed from the same layer of material, i.e., the first conductive portion and the pixel electrode are formed through one patterning process from the same layer of material; or, the first conductive portion and the common electrode can be configured to be formed from the same layer of material, i.e., the first conductive portion and the common electrode are formed through one patterning process from the same layer material, which is not limited thereto.

For example, in the liquid crystal display panel provided by the embodiments of the present invention, in order to conveniently bond a printed circuit board on the array substrate, as illustrated by FIG. 8, the opposed substrate 2 is required to be configured to expose a wiring terminal which is used for electrically connecting the printed circuit board and located at a side of the array substrate 1, and the exposed region is the bonding region E, besides, an upper edge frame and a left edge frame of the liquid crystal display panel are generally provided with a bonding region. In order to conveniently perform the resistance test between any two first conductive portions, as illustrated by FIG. 7, the first conductive portions 5 which are arranged along two side edges (the upper frame and the left frame illustrated by FIG. 7) of the array substrate 1 where a bonding region is provided can extend into the bonding region, in order to avoid the problem that it can hardly test the micro gap or breaking sealant problem through electrical test due to the first conductive portions 5 being electrically connected through a peripheral wirings or a wiring terminal, the first conductive portions 5 extending into the bonding region are required to be configured to be insulated with the peripheral wirings and the wiring terminal which are located in the bonding region.

For example, in the liquid crystal display panel provided by the embodiments of the present invention, any two of the first conductive portions extending into the bonding region can be used for resistance test, and it can be determined that whether there is a micro gap or breaking sealant problem in the sealant between the two first conductive portions according to the tested resistance values. As illustrated by FIG. 7, the resistance value between a testing point F1 and a testing point F2 can be tested to judge whether there is a micro gap or breaking sealant problem in the whole sealant; if the resistance value between the testing point F1 and the testing point F2 is a limited value, it can be determined that there is no micro gap or breaking sealant problem in the whole sealant, and the subsequent processes can be conducted; if the resistance value between the testing point F1 and the testing point F2 is abnormal, it can be determined that there is a micro gap or breaking sealant problem in the sealant, and it is necessary to intercept the liquid crystal display panel from entering the subsequent processes. Besides, upon the resistance value between the testing point F1 and the testing point F2 is abnormal, the resistance value between a testing point F3 and a testing point F4 can be tested to judge whether there is a micro gap or breaking sealant problem in the sealant in the non-bonding region (i.e., the lower frame and the right frame) of the liquid crystal display panel; if the resistance value between the testing point F3 and the testing point F4 is a limited value, it can be determined that there is no micro gap or breaking sealant problem in the sealant in the non-bonding region (i.e., the lower frame and the right frame). Upon the resistance value between the testing point F3 and the testing point F4 is a limited value, testing points between the testing point F1 and the testing point F4 can be selected to continue to be subjected to the resistance test, the resistance value between the testing point F1 and the testing point F5 and the resistance value between the testing point F4 and the testing point F5 can be tested, in this way, the position of the micro gap and breaking sealant can be roughly determined by means of continuously narrowing the testing range.

For example, in the liquid crystal display panel provided by the embodiments of the present invention, the first conductive portions extending into the bonding region and the peripheral wirings and wiring terminal which are located in the bonding region are insulated with each other, which can be realized by the following structure. As illustrated by FIG. 5b, the first conductive portion 5 and the peripheral wirings 16 and wiring terminal 17 which are located in the bonding region E are disposed in different layers, and an insulating layer 18 can be disposed between a film layer where the first conductive portion 5 is located and the film layer where the peripheral wirings 16 and wiring terminal 17 are located.

Certainly, in the liquid crystal display provided by the embodiments of the present invention, the insulating layer can be omitted, the mutual insulation between the first conductive portions extending into the bonding region and the peripheral wirings and wiring terminal which are located in the bonding region can be realized by not overlapping the orthographic projections on the array substrate of the first conductive portions and the orthographic projections on the array substrate of the peripheral wirings and wiring terminal which are located in the bonding region, which is not limited thereto.

Figure 10:
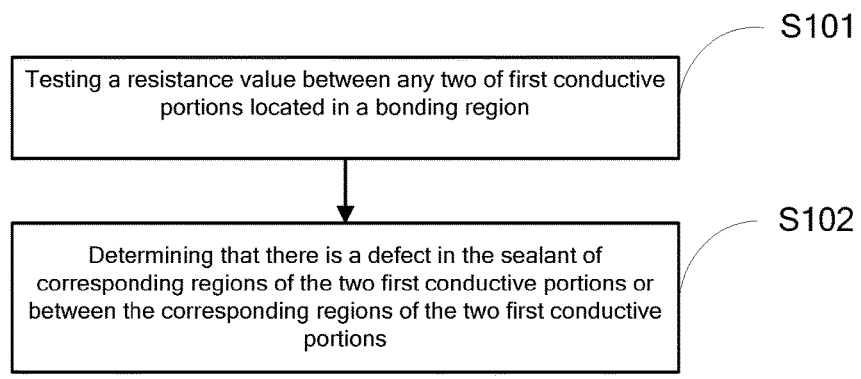
FIG. 10 is a flow diagram of a sealing performance testing method of a liquid crystal display panel provided by an embodiment of the present invention.

Based on the same invention concept, the embodiments of the present invention further provide a sealing performance testing method of a liquid crystal display panel, used to test the liquid crystal display panel provided by the present invention, and as illustrated by FIG. 10, comprising the following steps:

S101: testing a resistance value between any two first conductive portions which are located in a bonding region;

S102: upon the tested resistance value is abnormal, determining that there is a defect in the sealant of the corresponding regions of the two first conductive portions or between the corresponding regions of the two first conductive portions. For example, the defect can be a micro gap between the sealant and the array substrate or the opposed substrate, or a breaking sealant problem in the sealant.

Based on the same invention concept, the embodiments of the present invention further provide a display device, including the abovementioned liquid crystal display panel provided by the embodiments of the present invention, the display device can be: a cell phone, flat plate computer, television, display, notebook, digital frame, navigator or any products or components having a display function. The embodiments of the display device can refer to the embodiments of the liquid crystal display panel, and the repeated portions are omitted herein.

Embodiments of the present invention provide a liquid crystal display panel, sealing performance testing method thereof and display device, in the liquid crystal display panel, a side of the array substrate facing the opposed substrate is provided with a plurality of independent first conductive portions, a side of the opposed substrate facing the array substrate is provided with a plurality of independent second conductive portions, all of the first conductive portions and all of the second conductive portions are electrically connected through the conductive spheres in the sealant to form a conductor whose boundaries are unclosed and surrounds the display region, in this way, the first conductive portion and the second conductive portion form an electrical test structure through the conductive spheres in the sealant, by means of testing the resistance value between any two first conductive portions on the array substrate, it can be determined that there is a micro gap or breaking sealant problem upon the resistance value is abnormal, and the yield of liquid crystal display panel can be improved by interrupt the liquid crystal display panel which having a micro gap or breaking sealant problem from entering the subsequent processes.

Apparently, one skilled person in the art can devise various variations and alternations within the scope and the spirit of the present invention. If these variations and alternations belong to the scope of the claims of the present invention and the equal art, then the present invention intends to include these variations and alternations. The foregoing are merely specific embodiments of the invention, but not limitative to the protection scope of the present disclosure. The protection scope of the invention should be defined by the accompanying claims The present disclosure claims the benefits of Chinese patent application No. 201610031600.3, which was filed on Jan. 18, 2016 and is fully incorporated herein by reference as part of this application.

The invention claimed is:

1. A liquid crystal display panel, comprising:
an array substrate;
an opposed substrate, disposed opposite to the array substrate;
a closed sealant disposed between the array substrate and the opposed substrate and surrounding a display region;
a plurality of independent first conductive portions, disposed at a side of the array substrate facing the opposed substrate; and
a plurality of independent second conductive portions, disposed at a side of the opposed substrate facing the array substrate,
wherein the sealant is an anisotropic conductive adhesive, all of the first conductive portions and all of the second conductive portions are electrically connected through the sealant to form an unclosed conductor surrounding the display region;
the sealant comprises a plurality of conductive spheres, all of the first conductive portions and all of the second conductive portions are electrically connected through the conductive spheres to form the unclosed conductor surrounding the display region;
each of the first conductive portions and each of the second conductive portions are respectively contacted with the sealant, the unclosed conductor comprises a continuous portion and an unclosed portion, in the continuous portion, any two adjacent ones of the first conductive portions are electrically connected through the conductive spheres and the second conductive portions which is electrically connected with the conductive sphere.

2. The liquid crystal display panel according to claim 1, wherein the conductive spheres are insulated with each other; orthographic projections of the first conductive portions on the array substrate and orthographic projections of the second conductive portions on the array substrate are alternately arranged along extending directions of four side edges of the array substrate; in the continuous portion, two adjacent orthographic projections are jointed or have an overlapping region, the conductive spheres are located at a joint site or in the overlapping region, such that the first conductive portion and the second conductive portion whose orthographic projections are jointed or have the overlapping region are electrically connected; in the unclosed portion, orthographic projections on the array substrate of the first conductive portion and/or the second conductive portion which are located at two ends of the unclosed portion are not jointed and do not have an overlapping region.

3. The liquid crystal display panel according to claim 2, wherein each of the first conductive portions is electrically connected with two conductive spheres which are adjacent in the extending directions of four side edges of the array substrate.

4. The liquid crystal display panel according to claim 2, wherein each of the second conductive portions is electrically connected with two conductive spheres which are adjacent in the extending directions of four side edges of the array substrate.

5. The liquid crystal display panel according to claim 1, wherein the conductive spheres comprise at least one conductive sphere group, each conductive sphere group comprises at least two conductive spheres which are electrically connected, the conductive sphere groups are insulated from each other; in the continuous portion, orthographic projections of the first conductive portions on the array substrate and orthographic projections of the second conductive portions on the array substrate are alternately arranged along extending directions of four side edges of the array substrate, all of the orthographic projections are not overlapped with each other; the first conductive portion and the second conductive portion whose orthographic projections are adjacent are respectively electrically connected with the two conductive spheres located at two ends of the conductive sphere group in one conductive sphere group; the first conductive portion and/or the second conductive portion which are located at two ends of the unclosed portion are respectively electrically connected with different conductive sphere groups.

6. The liquid crystal display panel according to claim 5, wherein the conductive spheres further comprise a plurality of independent conductive spheres, and the independent conductive spheres are insulated from each other;
in the continuous portion, orthographic projections on the array substrate of the first conductive portions and the second conductive portions which are electrically connected through the independent conductive spheres are alternately arranged along the extending directions of side edges of the array substrate; two adjacent orthographic projections are jointed or have an overlapping region, the independent conductive spheres are located at a joint site or in the overlapping region, such that the first conductive portion and the second conductive portion whose orthographic projections are jointed or have an overlapping region are electrically connected; in the unclosed portion, orthographic projections on the array substrate of the first conductive portion and/or the second conductive portion which are located at two ends of the unclosed portion of the conductor are not jointed or do not have an overlapping region;
in the continuous portion, orthographic projections on the array substrate of the first conductive portions and the second conductive portions which are electrically connected through the conductive sphere group are alternately arranged along extending directions of side edges of the array substrate, all of the orthographic projections are not overlapped with each other; the first conductive portion and the second conductive portion whose orthographic projections are adjacent are respectively electrically connected with the two conductive spheres located at two ends of the conductive sphere group in one conductive sphere group; in the unclosed portion, the first conductive portion and/or the second conductive portion which are located at two ends of the unclosed portion of the conductor are respectively electrically connected with different conductive sphere groups.

7. The liquid crystal display panel according to claim 1, further comprising:
a pixel electrode and a common electrode line which are located at the side of the array substrate facing the opposed substrate;
a common electrode located at the side of the opposed substrate facing the array substrate;
a third conductive portion which is located between the array substrate and the sealant, insulated with the pixel electrode and electrically connected with the common electrode line; and
a fourth conductive portion which is located between the opposed substrate and the sealant and electrically connected with the common electrode,
wherein the third conductive portion and the fourth conductive portion are electrically connected through the sealant to electrically connect the common electrode and the common electrode line; the first conductive portions are respectively insulated with the pixel electrode, the common electrode line and the third conductive portion, the second conductive portions are respectively insulated with the common electrode and the fourth conductive portion.

8. The liquid crystal display panel according to claim 7, wherein the first conductive portions and the pixel electrode are formed from a same layer of material.

9. The liquid crystal display panel according to claim 7, wherein the second conductive portions and the common electrode are formed from a same layer of material.

10. The liquid crystal display panel according to claim 7, wherein the third conductive portion and the pixel electrode are formed from a same layer of material.

11. The liquid crystal display panel according to claim 7, wherein the fourth conductive portion and the common electrode are formed from a same layer of material.

12. The liquid crystal display panel according to claim 1, further comprising:
a common electrode, a common electrode line, and a pixel electrode insulated with the common electrode and the common electrode line located at the side of the array substrate facing the opposed substrate,
wherein the first conductive portions are respectively insulated with the pixel electrode, the common electrode and the common electrode line.

13. The liquid crystal display panel according to claim 12, wherein the first conductive portions and the pixel electrode or the common electrode are formed from a same layer of material.

14. The liquid crystal display panel according to claim 1, wherein the array substrate comprises a bonding region, the bonding region is disposed at least one side edge of the array substrate, the first conductive portions disposed at the side edge where the bonding region is provided extends into the bonding region; the first conductive portions extending into the bonding region are insulated with a peripheral wiring and a wiring terminal which are located in the bonding region.

15. The liquid crystal display panel according to claim 14, wherein any two of the first conductive portions extending into the bonding region are configured for a resistance test.

16. The liquid crystal display panel according to claim 15, wherein the first conductive portions extending into the bonding region and the peripheral wiring and the wiring terminal which are located in the bonding region are disposed in different layers; the liquid crystal display panel further comprises an insulating layer disposed between a layer where the first conductive portion is located and a layer where the peripheral wiring and the wiring terminal are located.

17. A display device, comprising: the liquid crystal display panel according to claim 1.

18. A sealing performance testing method of a liquid crystal display panel, used for testing the liquid crystal display panel according to claim 1, comprising:
testing a resistance value between any two of the first conductive portions; and
upon a tested resistance value being abnormal, determining that there is a defect in the sealant in corresponding regions of the two first conductive portions or between the corresponding regions of the two first conductive portions.

* * * * *